(12) United States Patent
Yao et al.

(10) Patent No.: US 8,159,786 B2
(45) Date of Patent: Apr. 17, 2012

(54) SUSPENSION WITH LOCALLY STRENGTHENED INTEGRATED TRACE CONNECTIONS

(75) Inventors: Ming Gao Yao, Dongguan (CN); Yi Ru Xie, Dongguan (CN); Sun Yu, Dongguan (CN); Lin Guo, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 850 days.

(21) Appl. No.: 12/184,133

(22) Filed: Jul. 31, 2008

(65) Prior Publication Data

US 2009/0034127 A1 Feb. 5, 2009

(51) Int. Cl.
*G11B 5/48* (2006.01)
*G11B 5/60* (2006.01)

(52) U.S. Cl. ............... 360/245.9; 360/234.5; 360/294.3

(58) Field of Classification Search .................. None
See application file for complete search history.

(56) References Cited

U.S. PATENT DOCUMENTS

| | | | | |
|---|---|---|---|---|
| 5,696,651 A * | 12/1997 | Endo et al. | ............... | 360/245.8 |
| 5,956,209 A * | 9/1999 | Shum | ............... | 360/244.3 |
| 6,282,064 B1 * | 8/2001 | Palmer et al. | ............... | 360/245.9 |
| 6,671,131 B2 | 12/2003 | Kasajima et al. | | |
| 6,700,749 B2 | 3/2004 | Shiraishi et al. | | |
| 6,801,398 B1 * | 10/2004 | Ohwe et al. | ............... | 360/234.6 |
| 2007/0002501 A1 * | 1/2007 | Honda et al. | ............... | 360/294.4 |
| 2007/0223143 A1 * | 9/2007 | Matsui et al. | ............... | 360/245.1 |

* cited by examiner

*Primary Examiner* — Jefferson Evans
(74) *Attorney, Agent, or Firm* — Nixon & Vanderhye PC (57) ABSTRACT

A head gimbal assembly may comprise a slider, a micro-actuator attached to the slider, a flexure to mount the slider and the micro-actuator, and a suspension comprising a support region, a main portion, and a moving portion, wherein the flexure comprises a plurality of trace sets to electrically couple the micro-actuator and the slider, and wherein the plurality of trace sets are laminated generally parallel to each other.

16 Claims, 15 Drawing Sheets

SUSPENSION WITH LOCALLY STRENGTHENED INTEGRATED TRACE CONNECTIONS

This application claims the benefit of priority from Chinese Patent Application Number 200710138200.3, filed on 31 Jul. 2007.

BACKGROUND OF THE INVENTION

A. Field of the Invention

The present invention is directed to head gimbal assemblies utilized in hard disk drive assemblies. More specifically, the present invention pertains to a head gimbal assembly comprising suspension design comprising an integrated plurality of trace connections designed to improve, among other things, performance during vibration, shock events, and high-speed rotation.

B. Description of the Related Art

Presently, the hard disk drive industry is observing great success in the consumer electronics environment. One of the main reasons for this success is the ability to achieve ever increasing storage capacity reflecting consumer demand. So far, these advancements are being achieved with minimal cost compared to other competitive technologies.

However, continuing these advances require overcoming arising design and manufacturing difficulties. These difficulties can be found both in the drive level and the component level.

Hard disk drives (HDD) are normally utilized as the major storage units in a computer. Generally, HDDs operate by retrieving and storing digitized information stored on a rotating disk. This retrieving and storing (i.e., "reading" and "writing") is done by a magnetic "head" embedded on a ceramic "slider" which is mounted on a "suspension". The assembled structure of slider and suspension is usually called the head gimbal assembly (HGA).

Figure 1:
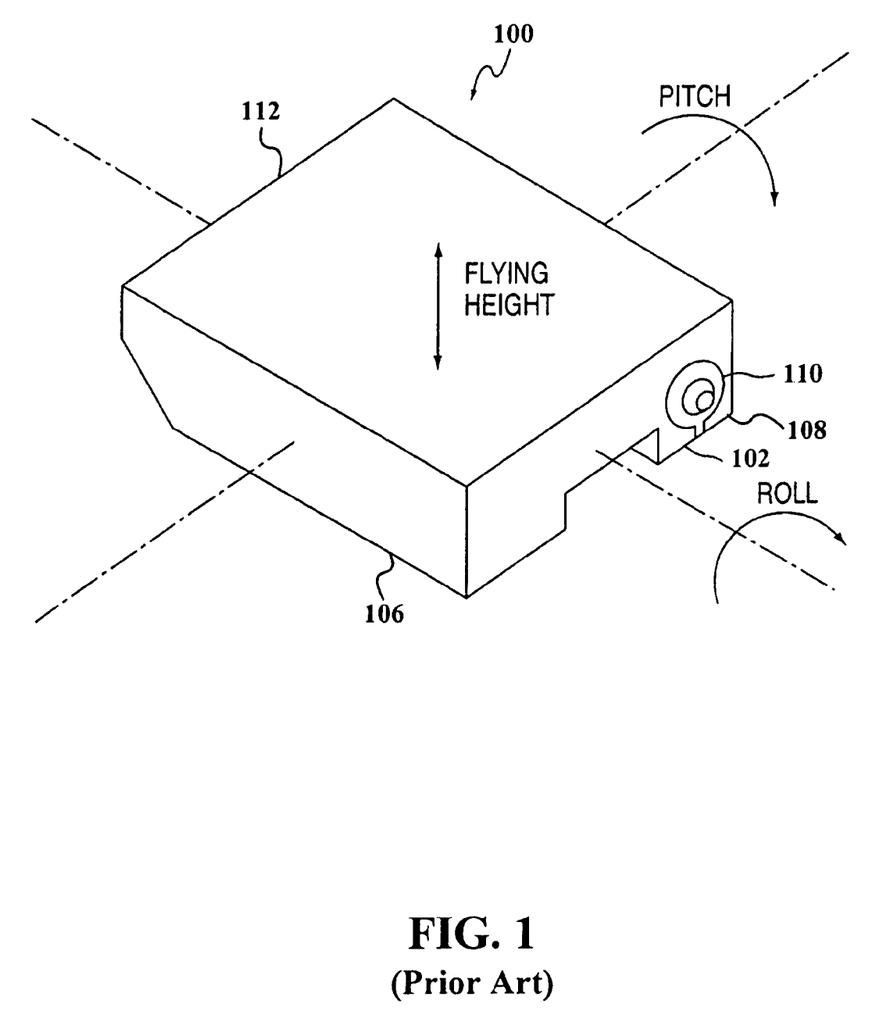
FIG. 1 illustrates a typical slider body embodiment.

FIG. 1 illustrates a typical slider body embodiment. As shown in FIG. 1, an air bearing surface (ABS) design 102 known for a common slider 100 may be formed with a pair of parallel rails 106 and 108 that extend along the outer edges of the slider surface facing the disk. The two rails 106 and 108 typically run along at least a portion of the slider body length from the trailing edge 110 to the leading edge 112. The leading edge 112 is defined as the edge of the slider that the rotating disk passes before running the length of the slider 100 towards a trailing edge 110. The transducer or magnetic element is typically mounted at some location along the trailing edge 110 of the slider as shown in FIG. 1.

In this embodiment, the rails 106 and 108 form the air bearing surface on which the slider flies, and provide the necessary lift upon contact with the air flow created by the spinning disk. As the disk rotates, the generated wind or air flow runs along underneath, and in between, the slider rails 106 and 108. As the air flow passes beneath the rails 106 and 108, the air pressure between the rails and the disk increases thereby providing positive pressurization and lift.

Figure 2A:
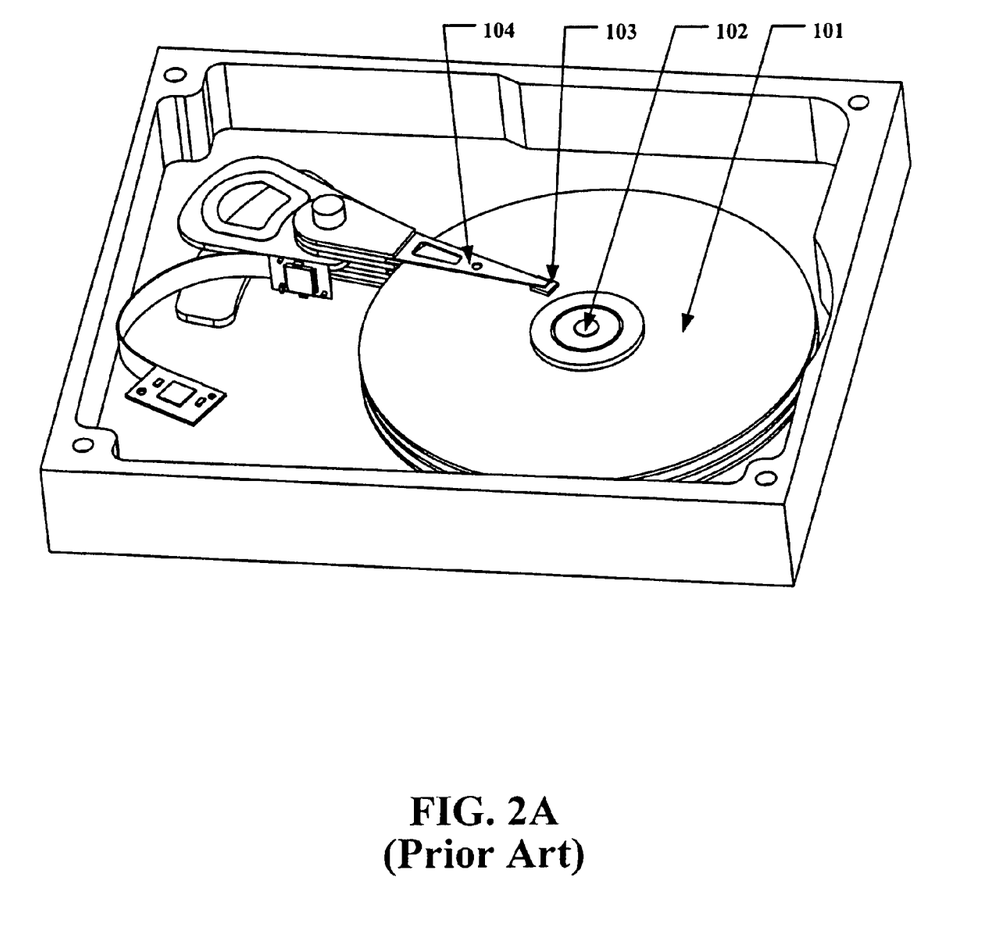
FIG. 2a-b illustrates a typical disk drive embodiment.
Figure 2B:
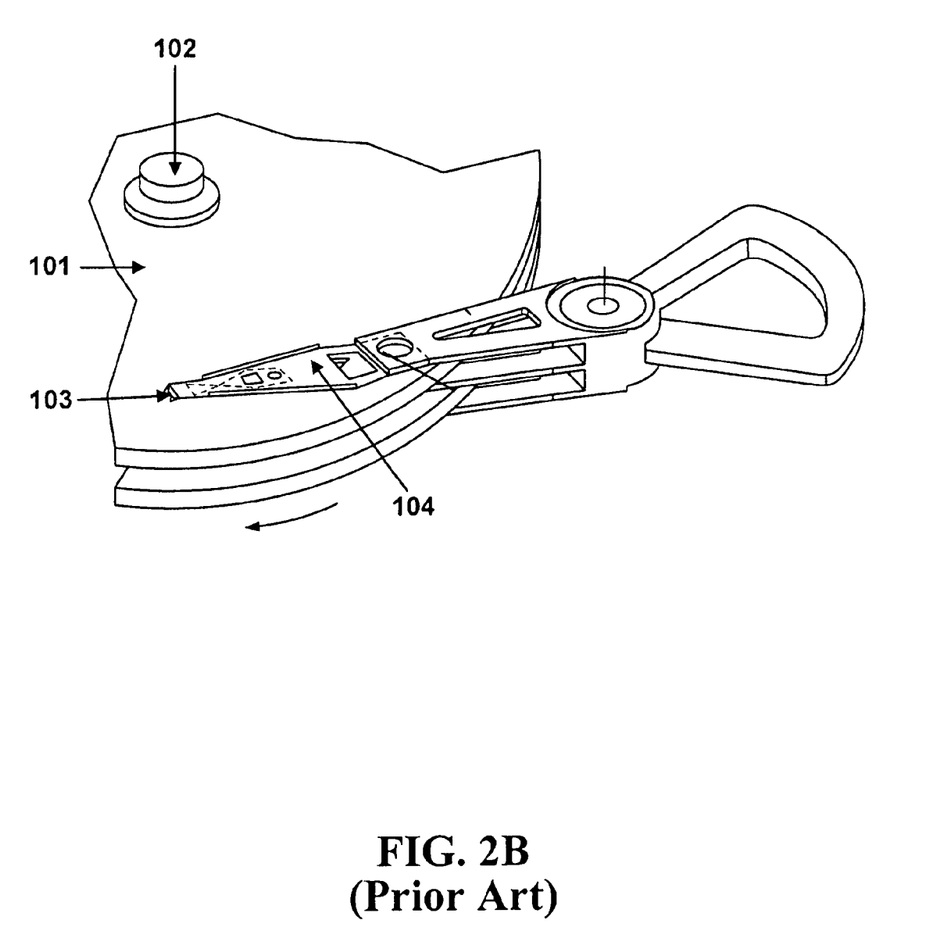

FIGS. 2a-b illustrates a typical disk drive embodiment. FIG. 2a illustrates spindle motor 102 that spins disk 101. Head gimbal assembly (HGA) 104 controls the head 103 flying above the disk. Typically, voice coil motors (VCM) are used to control the motion of head gimbal assembly 104 over the magnetic hard disk.

In the present art, micro-actuators are now being used to "fine-tune" the head placement because of the inherent tolerances (dynamic play) that exist in positioning a head by a VCM alone. This enables a smaller recordable track width, which in turn increases the density the "tracks per inch" (TPI) value of the hard disk drive. FIG. 2b is an exploded view of the aforementioned elements of FIG. 2a.

Figures 3A, 3B, 3C:
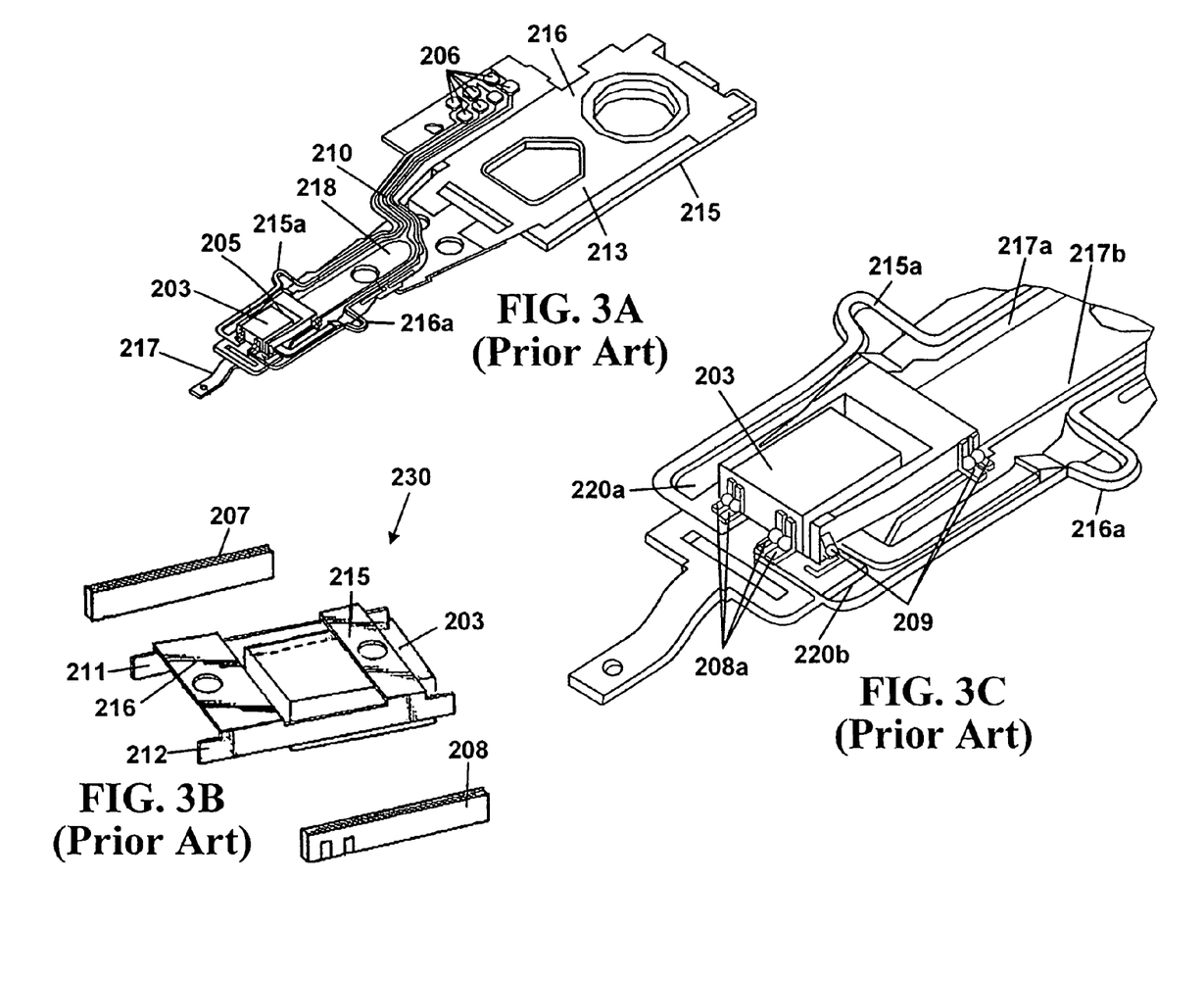
FIG. 3a-c illustrates various views of a typical HGA embodiment.

FIG. 3a-c illustrates various views of a typical HGA embodiment. FIG. 3a illustrates a typical HGA embodiment comprising a suspension 213 to load micro-actuator 205 with a head slider 203. Suspension 213 may comprise base plate 215, hinge 216, and load beam 217. Flexure 218 may be attached to hinge 216 and load beam 217 (e.g., through laser welding). Traces 210 may be laminated on the flexure 218, and may comprise two group leads 215a and 216a to electrically couple head slider 203. Traces 210 may also extend outwardly beyond the edges of flexure 218. Spaces 220a and 220b may be located between leads 215a and 216a and flexure 218. Traces 210 may also comprise leads 217a and 217b may extend from the middle region of flexure 218 and extend along both sides of suspension to electrically couple micro-actuator 205. Traces 210 may be electrically connected to suspension bonding pads 206.

FIG. 3b illustrates a typical metal frame micro-actuator structure incorporating a slider. Micro-actuator 205 may comprise metal frame 230 further comprising side arms 211 and 212. Micro-actuator 205 may further comprise bottom support arm 216 and a top support arm 215, which may be coupled to side arms 211 and 212. Top support arm 215 and bottom support arm 216 may be mounted on suspension by epoxy or laser wielding. Slider 203 may be mounted on top support arm 215 (as shown). Two PZT elements 207 and 208 may be attached along the outside of two side arms 211 and 212, and may be electrically connected to leads 217a and 217b (as described above).

FIG. 3c illustrates a metal frame micro-actuator mounted on a suspension. In this embodiment, electric balls 208a electrically couple slider 203 to suspension traces 210 and electrical balls 209 couple PZT element 207 and 208 to suspension traces 210 on each side of the side arms 211 and 212. Electrical connection balls 209 may electrically couple micro-actuator 205 to suspension traces 210. Electrical connection balls may be fabricated by, for example, gold ball bonding or solder ball bonding.

Figure 4A:
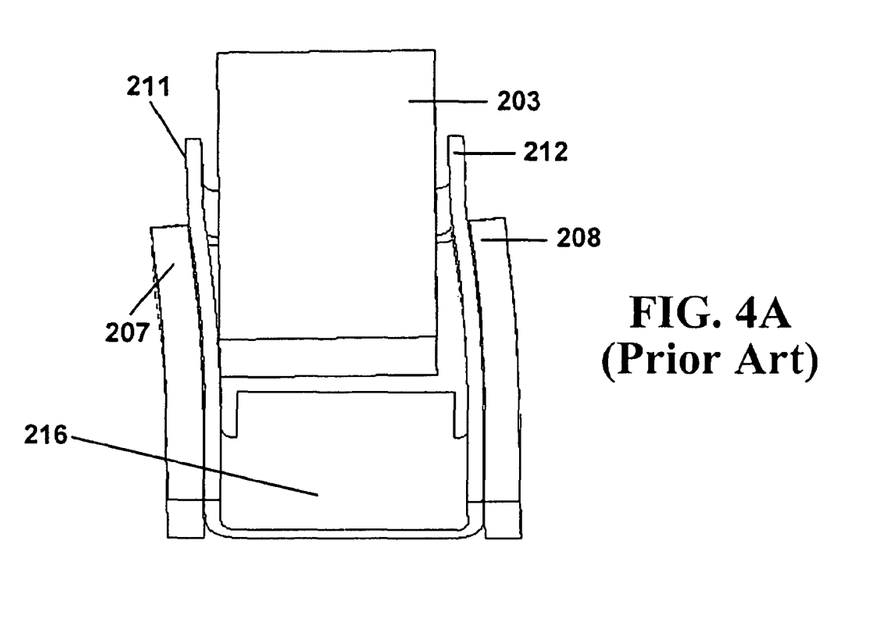
FIG. 4a is an exemplary illustration of the movement of a micro-actuator.

FIG. 4a is an exemplary illustration of the movement of a micro-actuator. When an electrical current is applied through suspension leads 217a and 217b, PZT elements 207 and 208 may expand or contract, causing side arm 211 or 212 to bend in a common lateral direction. For example, in the first half period, the PZT element 207 will shrink and cause the side metal arm 211 to deform and move slider 203 toward the left side. Conversely, when the voltage go to the second half period, the PZT element 208 will shrink and cause the side metal arm 212 to deform and move slider 203 toward the right side. In addition, in the case of the embodiment described in FIGS. 3a-c, spaces 220a and 220b and the flexibility of the two leads 215a/216a allow slider 203 to freely move when directed by micro-actuator 205.

Figure 4B:
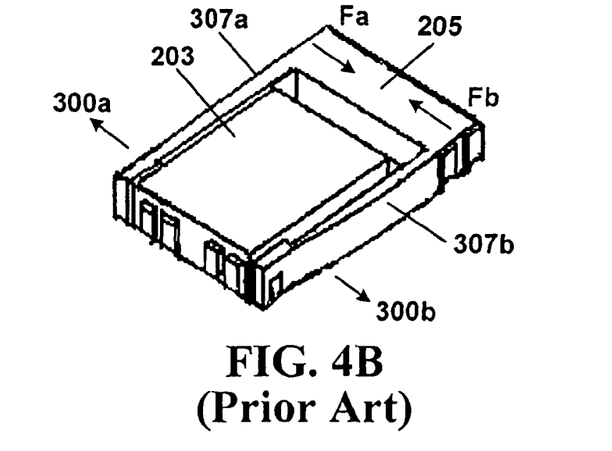
FIG. 4b illustrates a typical micro-actuator/slider embodiment that may experience a HGA resonance problem.

During operational motion, a micro-actuator/slider embodiment typically generates lateral inertial forces ("reaction forces") that may cause unwanted resonance throughout the HGA. FIG. 4b illustrates a typical micro-actuator/slider embodiment that may experience resonance. In operation, when a sine voltage is input to operate the micro-actuator, in the first half period, one side arm 307a may bend toward out side (indicated by arrow 300a). In doing so, it may also generate a reaction force Fa in the other direction. And since the micro-actuator frame is typically mounted to suspension (e.g., as shown in FIG. 3c), the reaction force Fa may transfer to the suspension and cause unwanted resonance. Similarly, when reversed, the other arm 307b may bend to the other side to generate a reaction force Fb, causing unwanted resonance as well. This resonance may affect the dynamic performance of the HGA and limit the servo bandwidth improvement of the hard disk drive.

Design improvements in performance of hard disk drives are often accompanied by increases in spindle RPM (rotation per minutes). In such cases, the motion of the rapidly rotating disk may create a turbulent flow of air ("windage") that may affect the performance of the hard drive components. In the case of the HGA embodiments with traces with spaces to ensure free movement (see e.g., FIG. 3c), the generation of a turbulent airflow may bear on nearby traces continuously during motion, and may, in some circumstances, even cause trace displacement.

Figure 5:
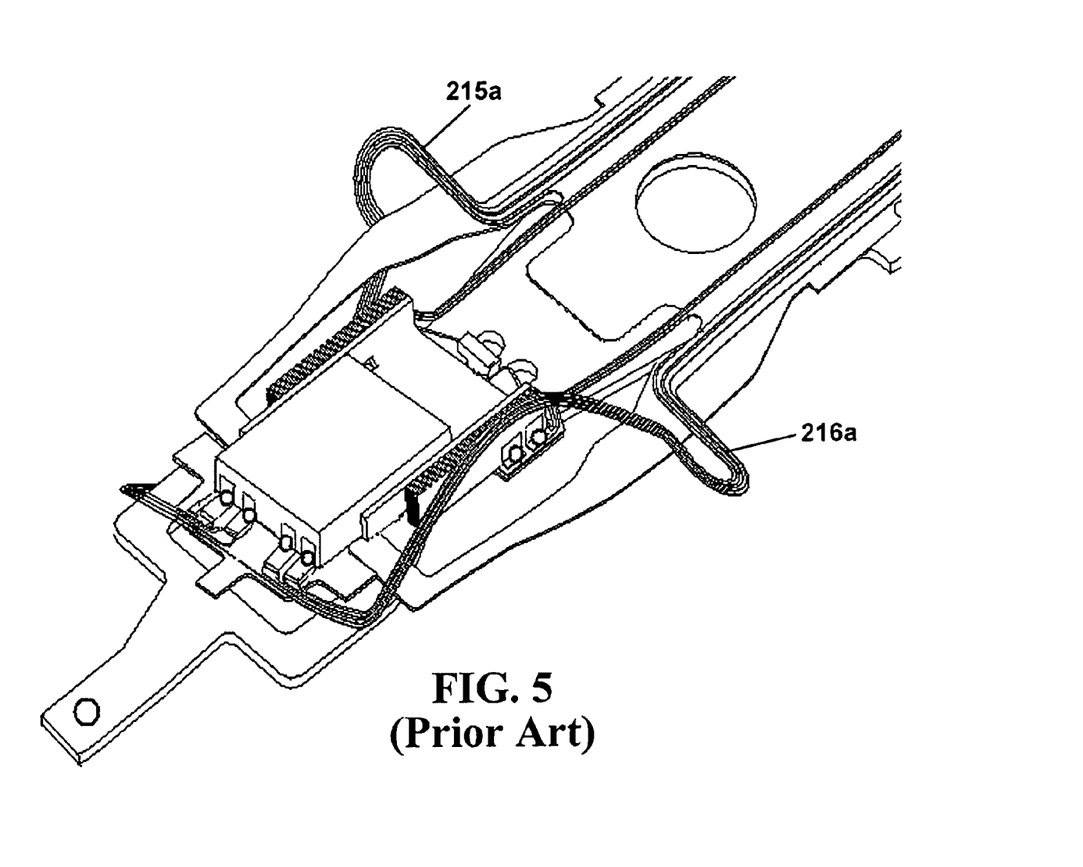
FIG. 5 illustrates the effects a suspension resonance problem as observed in typical HGA embodiments.

FIG. 5 illustrates effects of trace turbulence as observed in typical HGA embodiments. As illustrated in FIG. 5, the turbulent flow of air may cause trace 215a to sway toward the backside of the load beam, while trace 216a may sway toward the top side of head slider 203. In other instances, traces 215a and 216a may sway toward the same side. These displacements may disrupt the proper movement of the head, thereby affecting the static and dynamic performance of the head and the performance of the hard disk drive as a whole.

Therefore, there is a need for a head gimbal assembly with improved characteristics that address at least the aforementioned problems.

DETAILED DESCRIPTION OF THE DRAWINGS

Detailed descriptions of one or more embodiments of the invention follow, examples of which may be graphically illustrated in the drawings. Each example and embodiment are provided by way of explanation of the invention, and not meant as a limitation of the invention. For example, features or described as part of one embodiment may be utilized with another embodiment to yield still a further embodiment. It is intended that the present invention include these and other modifications and variations.

An apparatus for the present invention pertains to suspension assembly with locally strengthened gimbal. In embodiments of the present application, a suspension assembly may include an integrated plurality of trace connections designed to improve, among other things, performance during vibration, shock events, and high-speed rotation.

Figure 6A:
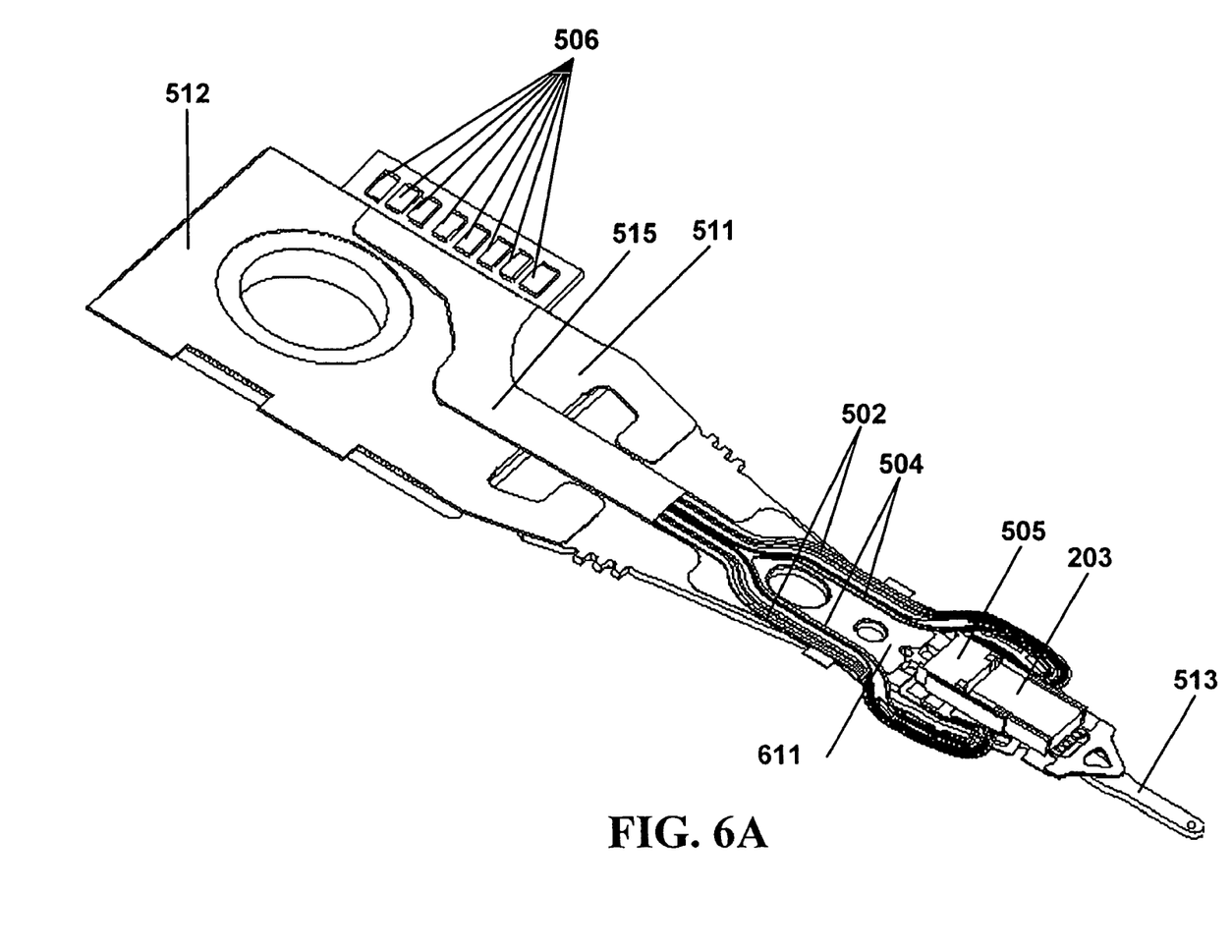
FIG. 6a illustrates an exemplary HGA embodiment according to the present invention.

FIG. 6a illustrates an exemplary HGA embodiment according to the present invention. In this embodiment, suspension 611 may comprise hinge 511, base plate 512, and load beam 513. Load beam 513 may be coupled to base plate 512 and hinge 511. Load beam 513 may support flexure 515 mounted on its tongue region (not shown). Flexure 515 may comprise head 203 and micro-actuator 505. Flexure 515, comprising outer traces 502 and inner traces 504, may be attached to hinge 511 and load beam 513 (e.g., by laser-welding).

Figure 6B:
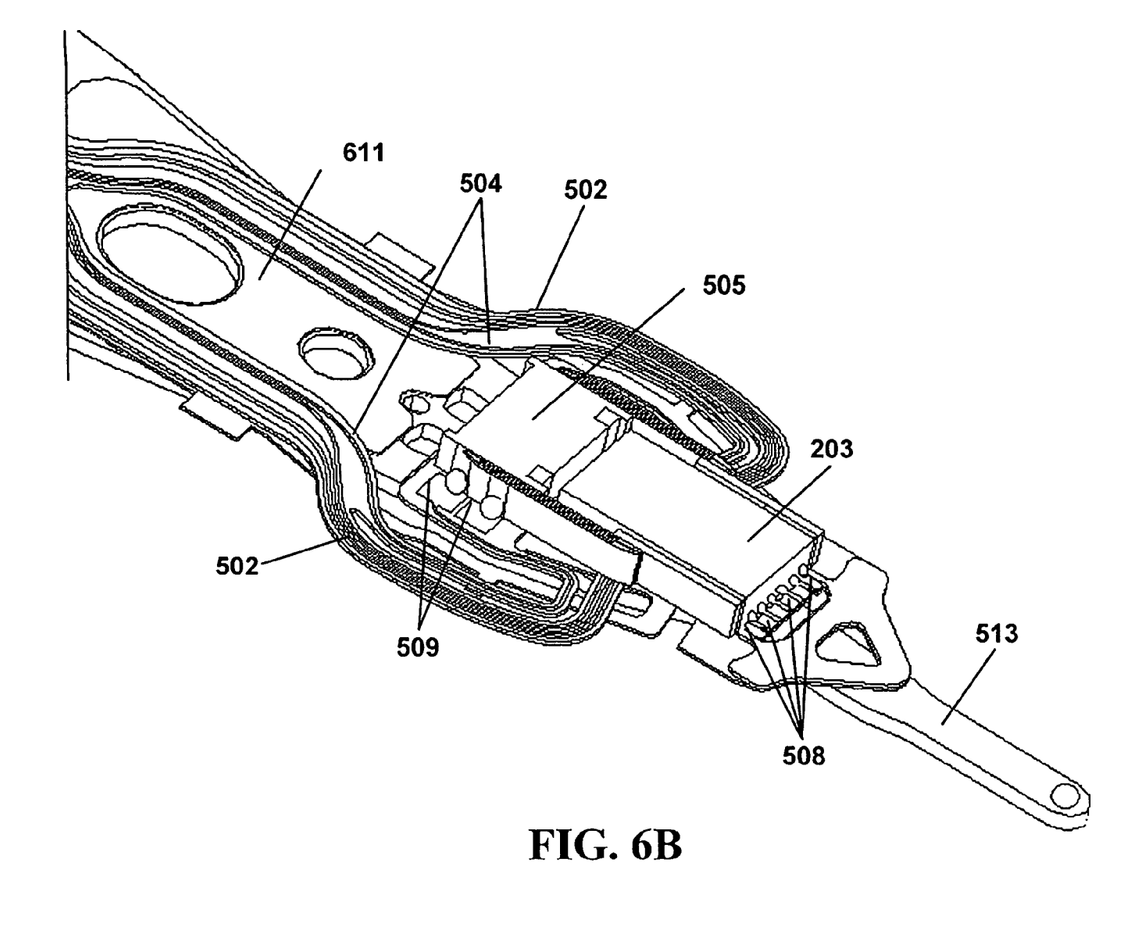
FIG. 6b illustrates another view of an exemplary HGA embodiment according to the present invention.

FIG. 6b illustrates another view of an exemplary HGA embodiment according to the present invention. Similar to the embodiment illustrated in FIG. 6a, in this embodiment, load beam 513 may support flexure 515, which may comprise micro-actuator 505 and slider 203 mounted on its tongue region (not shown).

In addition, in this embodiment, flexure 515 may further comprise outer traces 502 and inner traces 504. Outer traces 502 may be electrically connected to slider 203 on one end at slider pads 508, and electrically connected at the other end at flexure pads 506. Inner traces 504 may be electrical connected to micro-actuator 505 on one end at micro-actuator pads 509, and electrically connected at the other end at flexure pads 506. As illustrated, in this embodiment, outer traces 502 may follow generally along the outer edges of suspension 611. Inner traces 504 may be set off the outer edges of the suspension 611 and outer traces 502, and may generally run parallel to outer traces 502. Flexure pads 506 may be located on the ends of the inner traces 504 and outer traces 502, and may be used to couple the HGA to a control system (not shown).

In this embodiment, at a location approximately near the front end of the arms of micro-actuator 505, inner traces 504 may wrap around in reverse direction to form a U-shape (at which point they may be no longer generally parallel to outer traces 502), and continue to connect with micro-actuator pads 509. Also, in this embodiment, at a location approximately near the front end of the arms of micro-actuator 505, outer traces 502 may turn toward slider 203, and continue under slider 203 to connect with slider pads 508 (as shown).

Figure 7A:
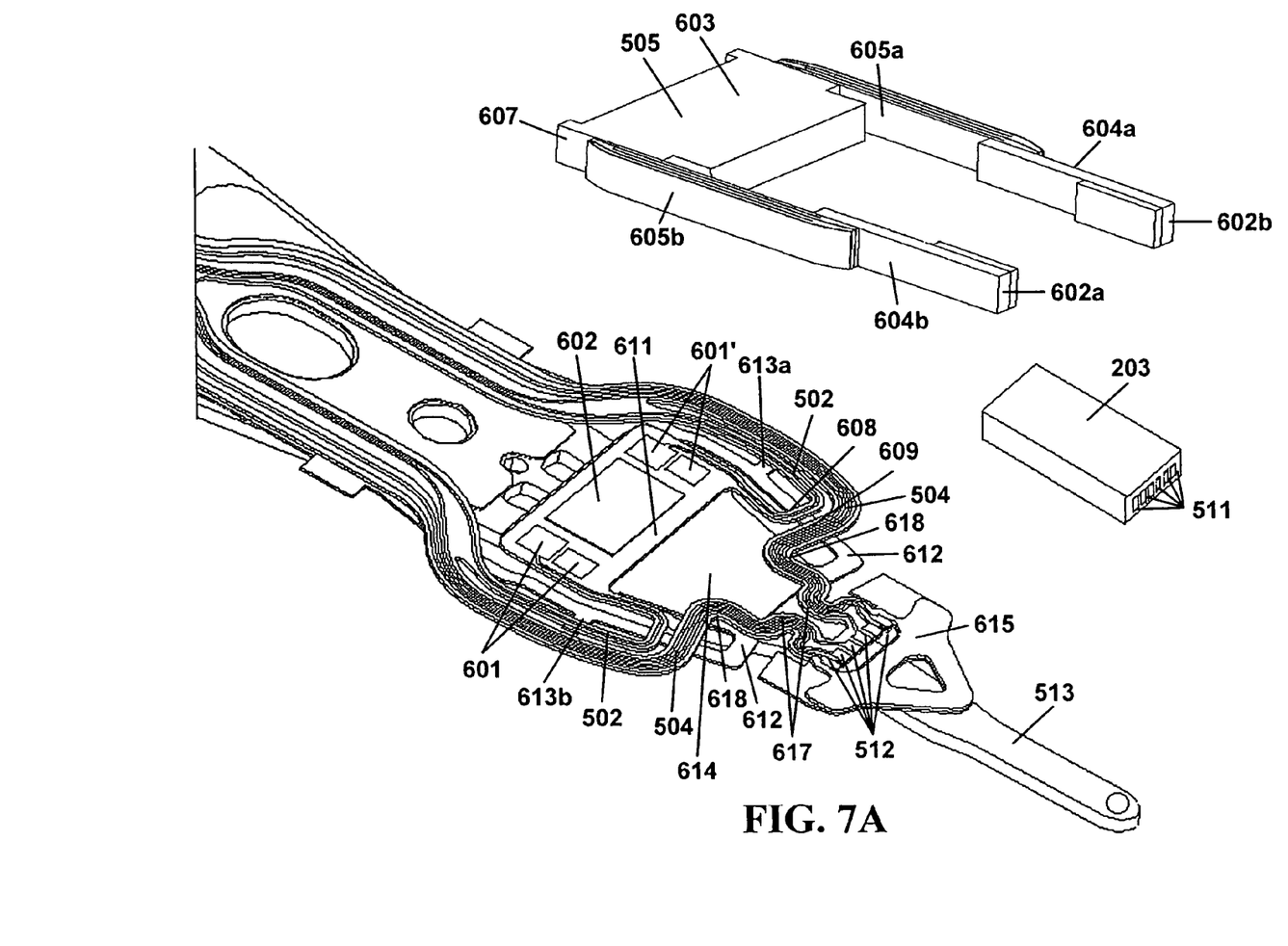
FIG. 7a illustrates an exploded view exemplary HGA embodiment according to the present invention.

FIG. 7a illustrates an exploded view of an exemplary HGA embodiment according to the present invention. In this embodiment, suspension 611 may comprise support region 602, main portion 614, and moving portion 615. Bottom support 603 of micro-actuator 505 may be mounted on support region 602 of the suspension 611 (and adjacent to main portion 614).

Micro-actuator 505 may comprise bottom support 603 and two side arms 602a and 602b. Two side arms 602a and 602b may each have a PZT element 605a and 605b, and a top base 604a and 604b. A portion of top base 604a or 604b (e.g., a top portion) may couple with slider 203 along the side surface of a trailing edge. A pad 607 for each PZT element 605a and 605b of micro-actuator 505 may be electrically coupled to micro-actuator pads 601 and 601' of suspension 611.

In addition, in this exemplary embodiment, two sets of traces, inner traces 502 and outer traces 504, may be laminated on flexure 511 generally parallel to each other and separated by a space (as shown). As inner traces 502 and outer traces 504 extend generally along the edges of micro-actuator 505, they may extend outwardly beyond along the edges of suspension 611.

In this embodiment, suspension 611 may also comprise out-rigger 612. In this embodiment, out-rigger 612 may extend from and run generally parallel to the edges of the suspension 611 (as shown). Out-rigger 612 may support inner traces 502 and outer traces 504 in multiple places. In this embodiment, out-rigger 612 may support inner traces 502 and outer traces 504 at, for example, a first location 608 and a second location 609 (located approximately near the front end of the arms of micro-actuator 505).

In this embodiment, out-rigger 612 may comprise folders 613a and 613b. As illustrated, along the portion where inner traces 502 and outer traces 504 extend generally parallel to each other, folders 613a and 613b may extend from out-rigger 612 to support both inner traces 502 and outer traces 504. In some embodiments, folders 613a and 613b may be made of stainless steel. In supporting inner traces 502 and outer traces 504, folders 613a and 613b may serve to prevent the vertical displacement of inner traces 502 and outer traces 504 during windage, vibration or shock events.

In this embodiment, at a location approximately near the front end of the arms of micro-actuator 505, inner traces 502 may wrap around in reverse direction to form a U-shape (at which point they may be no longer generally parallel to outer traces 502), and continue to connect with micro-actuator pads 601. As shown in this illustrated exemplary embodiment, as inner traces 502 wrap around, they may be supported by out-rigger 612 (e.g., at first location 608), which may also prevent trace displacement.

As illustrated, in this exemplary embodiment, at a location approximately near the front end of the arms of micro-actuator 505, outer traces 504 may turn inward toward main portion 614 and extend under slider 203 to connect with slider pads 512. As outer traces 504 turn inward, they may also be supported by out-rigger 612 (e.g., at first location 609), which may prevent displacement as well.

In this embodiment, in turning inward and extending toward moving portion 615, outer traces 504 may comprise a first curve 618 in between main portion 614 and moving portion 615. First curve 618 may extend laterally inward and then toward moving portion 615 to form a L-shape.

In addition, after turning inward and extending toward moving portion 615, outer traces 504 may comprise a second curve 617 in between main portion 614 and moving portion 615. In this embodiment, first curve 618 and second curve 617 may extend under slider 203 to extend to slider pads 512.

Since these portions of outer traces 504 may be located under the slider 203 after assembly, these portions may not be affected by windage. First curve 618 and second curve 617, along with supports from out-rigger 612 (e.g., at first location 608 and second location 609), may combine to sufficiently curb the effects of windage or shock and preserve the proper functioning of the HGA.

Figure 7B:
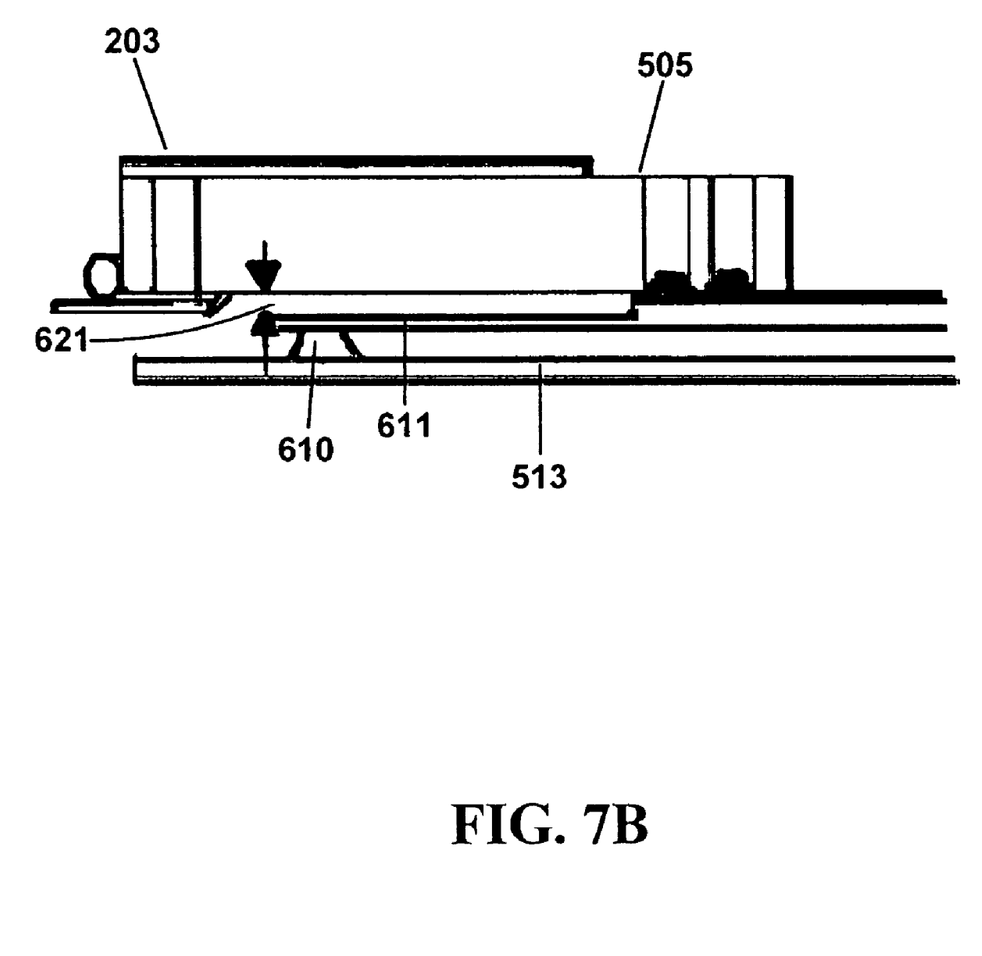
FIG. 7b illustrates a side view of an exemplary HGA embodiment according to the present invention.

FIG. 7b illustrates a side view of an exemplary HGA embodiment according to the present invention. Load beam 513 may comprise dimple 610 to support suspension 611. Micro-actuator 505 and slider 203 may be partially mounted on suspension 611. Parallel gap 621 may be utilized to ensure the free movement of micro-actuator 505.

Figure 8:
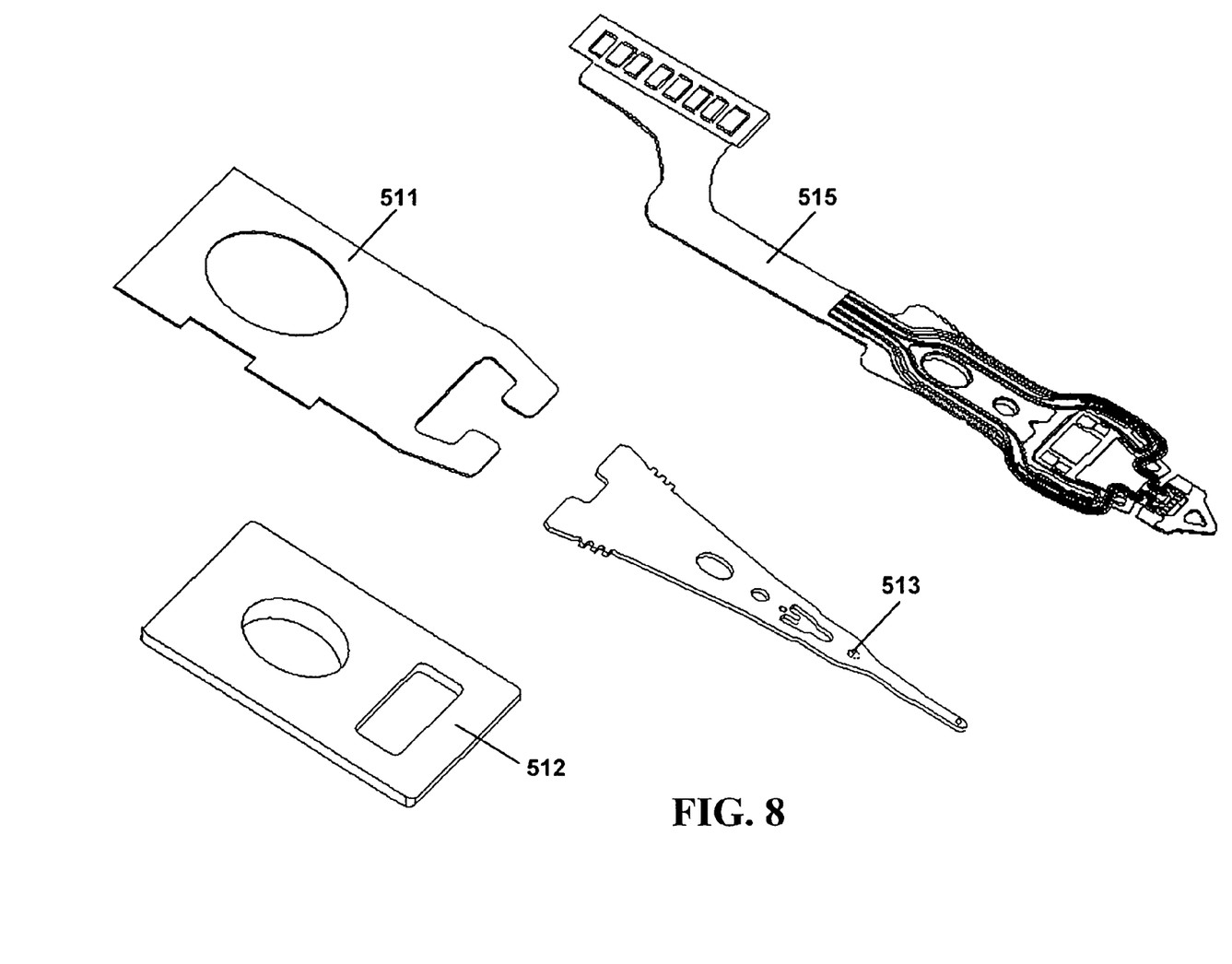
FIG. 8 illustrates a disassembled view of one exemplary embodiment according to the present invention.

FIG. 8 illustrates a disassembled view of one exemplary embodiment according to the present invention. In this embodiment, the suspension assembly may comprise base plate 512, hinge 511, load beam 513, and flexure 515.

Figure 9:
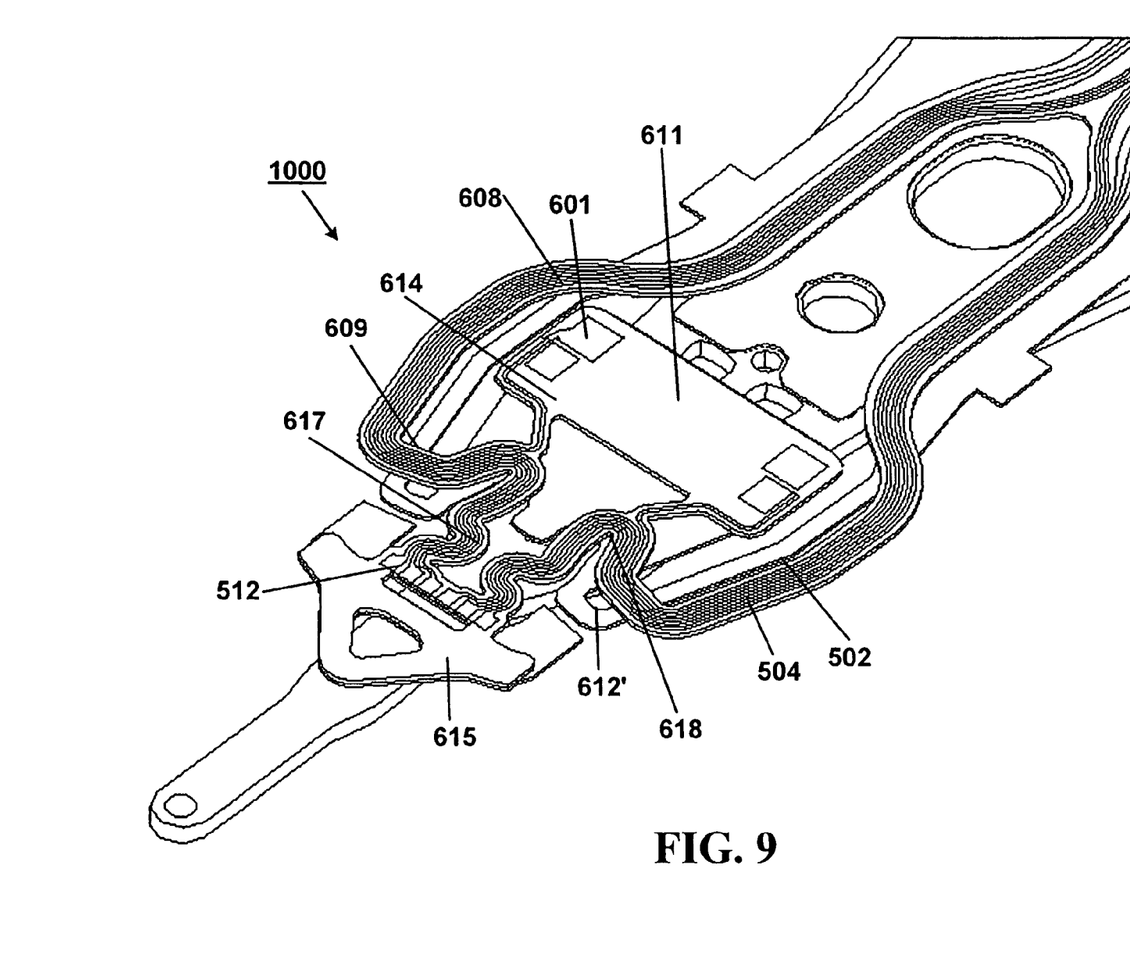
FIG. 9 illustrates an exemplary HGA embodiment according to the present invention.

FIG. 9 illustrates another exemplary HGA embodiment according to the present invention. Head gimbal assembly 1000 may comprise moving portion 615 and a main portion 6914. Similar to the embodiment described in FIG. 7a, inert traces 502 and outer traces 504 may be laminated generally parallel to each other. In this embodiment, inner traces 502 and outer traces 504 may extend and run along the edges of the suspension. However, unlike the embodiment described in FIG. 7a, inner traces 502 and outer traces 504 may be located generally adjacent to each other.

Furthermore, in this embodiment, out-rigger 612' may extend from and run generally parallel to the edges of the suspension 611. As in the case of the exemplary embodiment illustrated in FIG. 7a, out-rigger 612' may support inner traces 502 and outer traces 504 in multiple places. In this embodiment, out-rigger 612' may support inner traces 502 and outer traces 504 in a first location 608 and a second location 609. Also, as shown in FIG. 9, out-rigger 612' may support either inner traces 502 or outer traces 504 (or both), before reaching the arms of micro-actuator 505 (e.g., at first location 608).

As inner traces 502 and outer traces 504 extend to a location approximately near the front end of the arms of micro-actuator 505 or near the outer regions of the suspension (e.g., moving portion 615), both inner trace 502 and outer traces 504 may turn inward then toward main portion 614. At this point, inner traces 502 may extend laterally outwardly toward main portion 614. Inner traces 502 may follow along the edges of main portion 614 and end at micro-actuator pads 601. Outer traces 504 may extend further toward back the ends of the suspension (e.g., toward moving portion 615) and may end at pads 512.

Similar to the embodiment described in FIG. 7a, outer traces 504 may comprise a first curve 618 in between main portion 614 and moving portion 615. In this embodiment, first curve 618 may extend toward main portion 614 and reverse back toward moving portion 615 to form a U-shape.

In addition, after turning inward and extending toward moving portion 615, outer traces 504 may comprise a second curve 617 in between main portion 614 and moving portion 615. In this embodiment, first curve 618 and second curve 617 may be located under slider 203 and allow outer traces 504 to extend to slider pads 512.

First curve 618 and second curve 617 of outer traces 504, along with support from out-rigger 612' (e.g., at first location 608 and second location 609), may combine to sufficiently curb the effects of windage or shock and preserve the proper functioning of the HGA.

Figure 10:
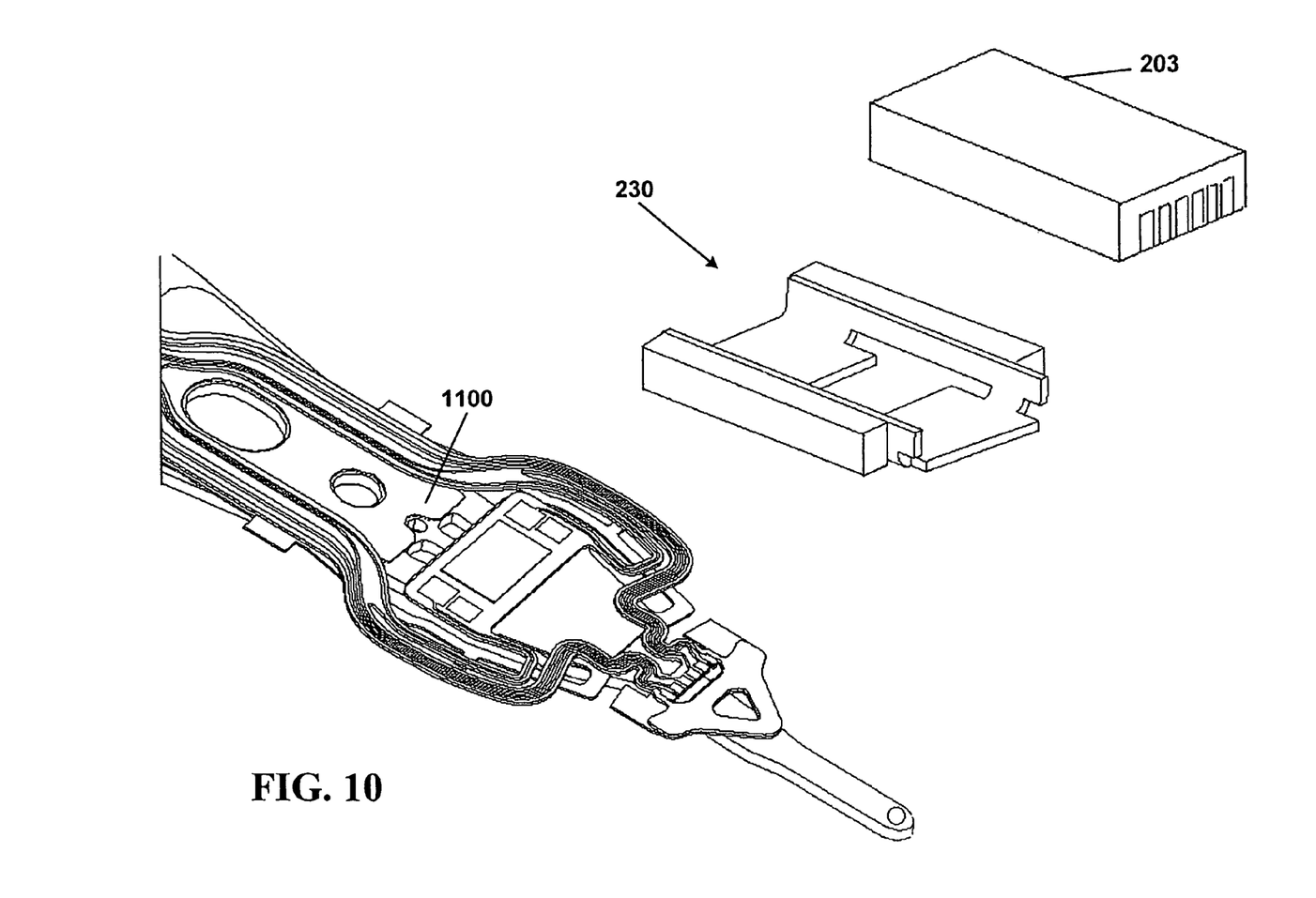
FIG. 10 illustrates an exemplary HGA embodiment according to the present invention.

FIG. 10 illustrates another exemplary HGA embodiment according to the present invention. In this embodiment, micro-actuator 230 (unlike the micro-actuator embodiment described in, for example, FIG. 7a) and slider 203 may be mounted on suspension 11100.

Figure 11:
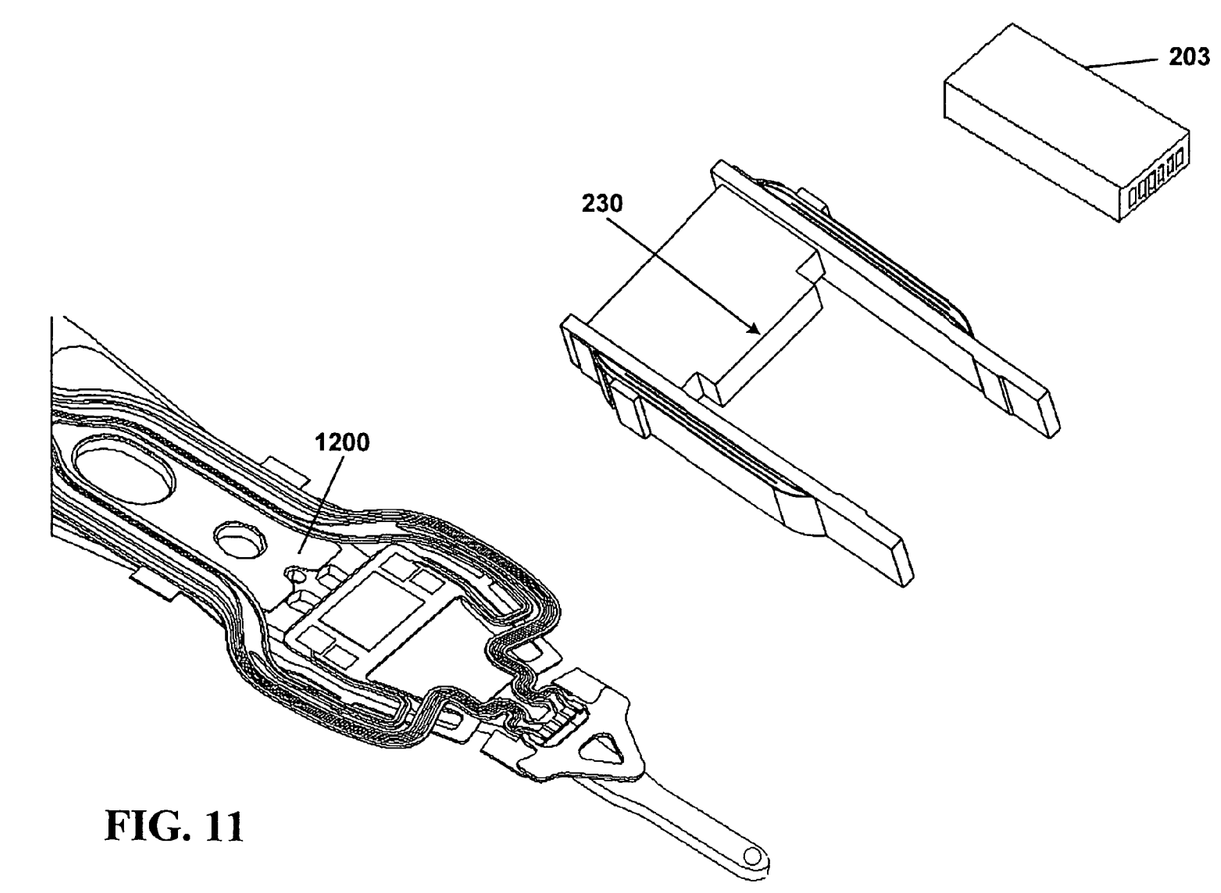
FIG. 11 illustrates an exemplary HGA embodiment according to the present invention.

FIG. 11 illustrates an exemplary HGA embodiment according to the present invention. In this embodiment, micro-actuator 230 (unlike the micro-actuator embodiment described in, for example, FIG. 7a and FIG. 10) and slider 203 may be mounted on suspension 1200.

Figure 12:
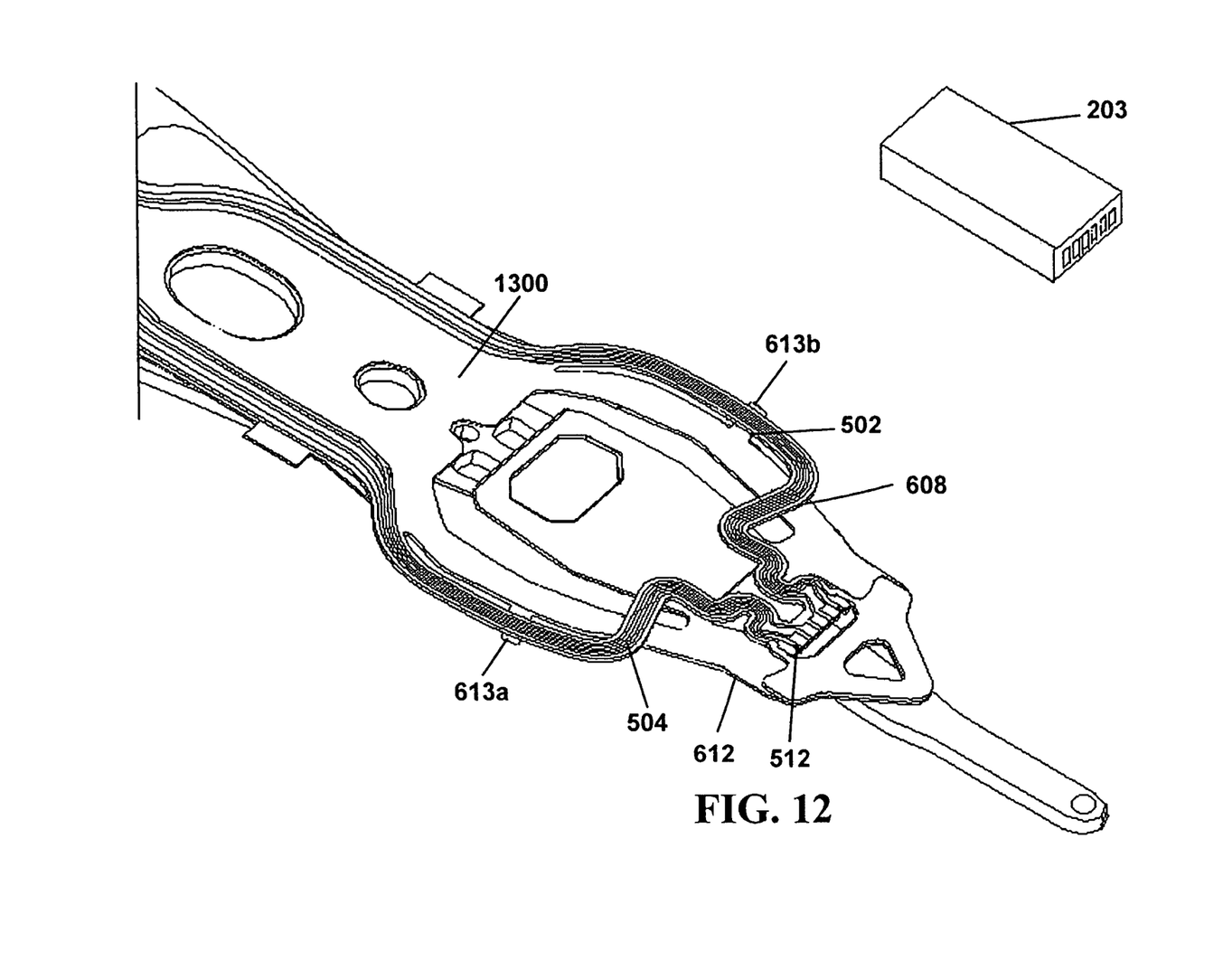
FIG. 12 illustrates an exemplary HGA embodiment according to the present invention.

FIG. 12 illustrates an exemplary HGA embodiment according to the present invention. This embodiment may be utilized for, among other things, single stage application (wherein the embodiment does not include a micro-actuator). In this embodiment, slider 203 may be mounted on suspension 1300. In this embodiment, there are no inner traces 502 to electrically connect a micro-actuator, only outer traces 504 to electrically connect slider 203.

As in the case of the exemplary embodiment illustrated in FIG. 7a, in this embodiment, suspension 611 may also comprise out-rigger 612. In this embodiment, out-rigger 612 may support outer traces 504 at, for example, a first location 608 (located approximately near the front end of the arms of micro-actuator 505). Also, in this embodiment, out-rigger 612 may comprise folders 613a and 613b to support outer traces 504.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of principles and variables. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

What is claimed is:

1. A head gimbal assembly comprising:
   a slider;
   a micro-actuator, comprising micro-actuator arms, attached to the slider;
   a flexure to mount the slider and the micro-actuator; and
   a suspension comprising a support region, a main portion, and a moving portion, wherein the flexure comprises a plurality of trace sets to electrically couple the micro-actuator and the slider, and wherein the plurality of trace sets are laminated generally parallel to each other,
   wherein the plurality of trace sets comprise a first set of traces and a second set of traces, and wherein the first set is to electrically connect the micro-actuator and the second set is to electrically connect the slider, and
   wherein the second set of traces extends generally along the outer edges of the suspension, and at a location approximately near a front end of the micro-actuator arms, extends underneath the slider.

2. The head gimbal assembly according to claim 1, wherein the plurality of trace sets are separated by a space.

3. The head gimbal assembly according to claim 1, wherein at a location approximately near a front end of the micro-actuator arms, the first set of traces wraps around in a reverse direction.

4. The head gimbal assembly according to claim 1, wherein at a location approximately near a front end of the micro-actuator arms, the first set of traces extends laterally inwardly toward the main portion, and follows along the edges of the main portion.

5. A head gimbal assembly according to claim 1, wherein the second set of traces extends underneath the slider toward the moving portion of the suspension, and comprises at least one curve between the main portion of the suspension and the moving portion of the suspension.

6. The head gimbal assembly according to claim 1, wherein the suspension comprises an out-rigger.

7. The head gimbal assembly according to claim 6, wherein the out-rigger supports the plurality of trace sets in at least one location.

8. The head gimbal assembly according to claim 6, wherein the out-rigger comprises a folder, and the folder supports the plurality of trace sets in at least one location.

9. A disk drive assembly comprising:
   a disk; a spindle motor to spin the disk; and
   a head gimbal assembly, wherein the head gimbal assembly comprises:
      a slider;
      a micro-actuator, comprising micro-actuator arms, attached to the slider;
      a flexure to mount the slider and the micro-actuator; and
      a suspension comprising a support region, a main portion, and a moving portion,
   wherein the flexure comprises a plurality of trace sets to electrically couple the micro-actuator and the slider, and wherein the plurality of trace sets are laminated generally parallel to each other,
   wherein the plurality of trace sets comprise a first set of traces and a second set of traces, and wherein the first set is to electrically connect the micro-actuator and the second set is to electrically connect the slider, and
   wherein the second set of traces extends generally along the outer edges of the suspension, and at a location approximately near a front end of the micro-actuator arms, extends underneath the slider.

10. The disk drive assembly according to claim 9, wherein the first set of traces are set off the second set of traces, and at a location approximately near a front end of the micro-actuator arms, wraps around in reverse direction.

11. The disk drive assembly according to claim 9, wherein at a location approximately near a front end of the micro-actuator arms, the first set of traces extends laterally inwardly toward the main portion, and follows along the edges of the main portion.

12. A disk drive assembly according to claim 9, wherein the second set of traces extends underneath the slider toward the moving portion of the suspension, and comprises at least one curve between the main portion of the suspension and the moving portion of the suspension.

13. The disk drive assembly according to claim 9, wherein the suspension comprises an out-rigger.

14. The disk drive assembly according to claim 13, wherein the out-rigger supports the plurality of trace sets in at least one location.

15. The disk drive assembly according to the claim 13, wherein the out-rigger comprises a folder, and the folder supports the plurality of trace sets in at least one location.

16. The disk drive assembly according to claim 9, wherein the first set of traces and the second set of traces extend outwardly beyond the edges of the suspension.

* * * * *